United States Patent [19]

Marin et al.

[11] Patent Number: 4,960,181
[45] Date of Patent: Oct. 2, 1990

[54] METHOD AND DEVICE FOR IMPROVING THE COEFFICIENT OF TRANSMISSION TO GEOLOGICAL FORMATIONS OF ENERGY CREATED BY A WELL SEISMIC SOURCE

[75] Inventors: Eric Marin, Versailles; Marcel Le Comte, Bezons, both of France

[73] Assignee: Institut Francais du Petrole, Rueil Malmaison, France

[21] Appl. No.: 420,598

[22] Filed: Oct. 12, 1989

Related U.S. Application Data

[63] Continuation of Ser. No. 225,356, Jul. 28, 1988, abandoned.

[30] Foreign Application Priority Data

Jul. 28, 1987 [FR] France .................... 87 10722

[51] Int. Cl.$^5$ ............................................. G01V 1/40
[52] U.S. Cl. .................... 181/106; 367/912; 181/401; 166/212
[58] Field of Search ............ 181/102–106, 181/401; 367/25, 911, 912; 166/65.1, 66, 206, 212, 216, 217; 175/230

[56] References Cited

U.S. PATENT DOCUMENTS

| 4,722,417 | 2/1988 | Selsam | 181/119 |
| 4,770,268 | 9/1988 | Magneville | 181/106 |
| 4,773,501 | 9/1988 | Dedole et al. | 181/106 |
| 4,817,755 | 4/1989 | Gildas | 181/106 |
| 4,858,718 | 8/1989 | Chelminski | 181/106 |

Primary Examiner—Brian S. Steinberger
Attorney, Agent, or Firm—Antonelli, Terry, Stout & Kraus

[57] ABSTRACT

A method is provided for improving the coefficient of transmission to geological formations of the energy generated by the firing of a seismic source lowered inside a well or borehole and a device for implementing same. A zone of the wall containing the seismic source is defined by confinement so as to prevent the propagation along the well, outside the confined zone, of the energy generated therein by the seismic source, when fired. The confinement is achieved by closing off the wall on each side of the seismic source. Two expandable members are used disposed in the wall on each side of the source and each comprising for example an elastomer sheath, an annular piston whose movement causes expansion of the sheath and hydraulic means for moving the piston.

12 Claims, 2 Drawing Sheets

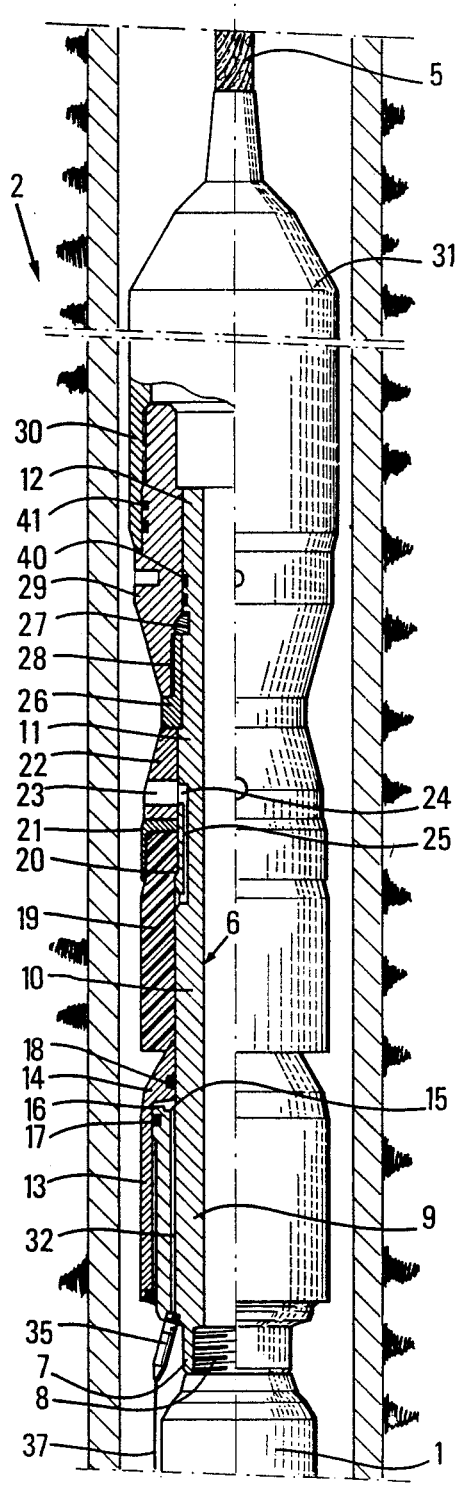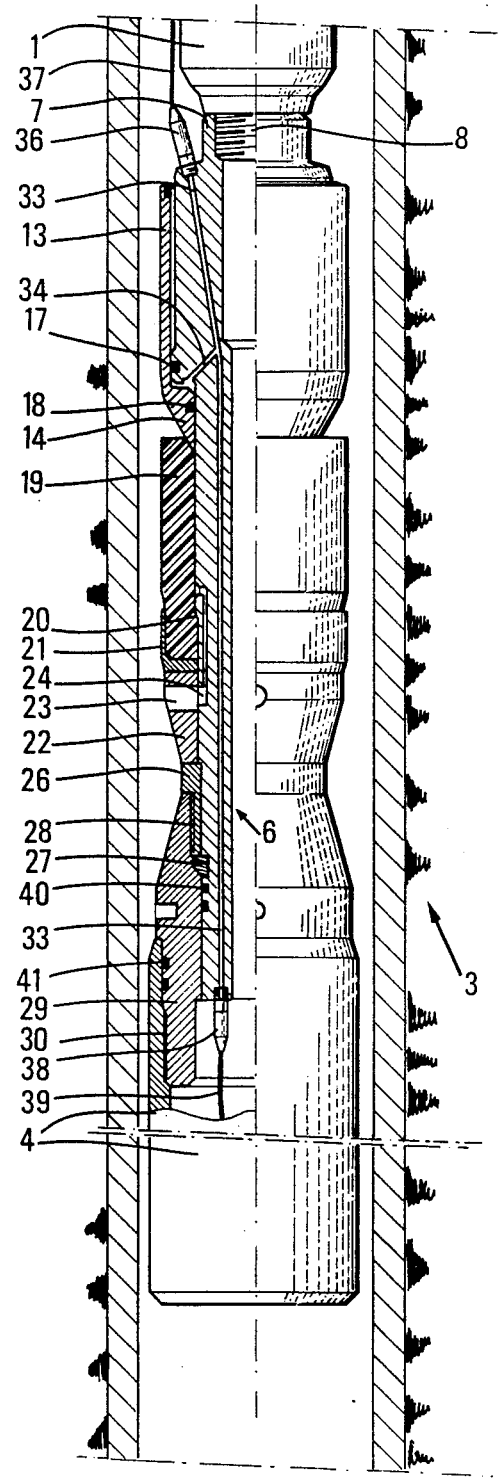

METHOD AND DEVICE FOR IMPROVING THE COEFFICIENT OF TRANSMISSION TO GEOLOGICAL FORMATIONS OF ENERGY CREATED BY A WELL SEISMIC SOURCE

This is a continuation of application Ser. No. 225,356, filed July 28, 1988 now abandoned.

BACKGROUND OF THE INVENTION

1. Field of the Invention

The invention relates to a method and device for substantially pinpointing the emission of a pulsed seismic source adapted to be lowered inside a well and to be coupled to the walls of the well by retractable anchorage means.

2. Description of the Prior Art

Many seismic prospection methods comprise the use of seismic sources lowered into wells or boreholes and activated successively at a plurality of positions at different depths. The waves emitted are received by receivers disposed in other wells or boreholes, which makes it possible to obtain a high power of resolution, or else disposed on the surface so as to restore oblique seismic profiles. The energy efficiency of seismic sources in wells is generally much better than that of sources operated on the surface, because they emit seismic waves under the weathered surface layer whose propagation characteristics are unfavorable, but it is largely conditioned by the means used for coupling them to the surrounding geological formations.

Percussion seismic sources generally comprise an elongated body suspended at the end of an electric suspension cable or a pipe string. The body is connected to coupling elements formed of arms, claws or mobile shoes which may be moved apart by actuating hydraulic cylinders and are applied to or driven into the walls of the well.

In other embodiments, the body of the seismic source is connected to an element of the packer type, well known by specialists, of the type having an expandable member formed of a central portion and a peripheral portion which can be expanded by rotating it with respect to the central portion. Packers may also be used comprising an enclosure defined by a deformable wall and which is expanded by injection of a pressurized liquid.

Different seismic sources associated with anchorage means are described in the French patent applications published under the numbers 2 597 214, 2 552 553, 2 558 601 respectively corresponding to U.S. Pat. Nos. 4,770,268, 4,773,501 and 4,648,478, and French patent application no. 2590994 corresponding to commonly-assigned copending U.S. application Ser. No. 936,618, filed Dec. 1, 1986.

Attempts have also been made to use in wells sources known in the field of sea or land seismic prospection such as implosion sources operating by fluid ejection or by sudden contraction of the volume of a closed enclosure, such as described in the French patent application published under the number 2 55 761 (corresponding to the U.S. Pat. No. 4,682,309) or else sparkers which generate pulses by the sudden discharge of an electric current between immersed electrodes or else explosion sources.

It has been discovered, when studying the behavior of such sources, that when a shock is produced at the time of triggering a source, a greater or lesser amount of energy, depending on the degree of coupling with the walls, is transmitted to the liquid column generally filling the well and in which it propagates.

The result is that the waves vibrating the liquid column in the well disturb the reception of the useful echos corresponding to signals transmitted directly to the walls by the source and complicate the processing of the data collected. Because of this loss of energy and its dispersion, the use of seismic well sources does not always give good results.

SUMMARY OF THE INVENTION

With the method of the invention, the transmission of a pulsed seismic source adapted to be lowered inside a well or borehole and to be coupled with the walls of the well by retractable anchorage means is made substantially pinpoint. It is characterized in that it comprises the confinement of a zone of the well containing the seismic source coupled with the wall, so as to prevent the propagation, along the well outside the confined zone, of the fraction of the energy generated by the seismic source when triggered and not transmitted directly to the walls by direct coupling.

The confinement is obtained for example by closing off the wall substantially sealingly on each side of the zone where the seismic source is anchored against the walls of the well.

The seismic emission device of the invention comprises a pulsed seismic source adapted to be lowered into a well or borehole and coupled with the formations surrounding the well by retractable anchorage means, for applying the energy emitted by the source directly to the walls. It is characterized in that it comprises in combination at least two expandable confinement members disposed on each side of the seismic source and connected thereto, to prevent the propagation along the well of the fraction of energy not transmitted directly to the walls of the well.

The seismic energy not transmitted directly to the surrounding formations by the anchorage means at the time of firing the source, remains then localized in the confined well zone. The result is that the well source may be considered as pinpoint and the disturbing effects induced by vibration of the liquid column contained in the well are practically eliminated.

BRIEF DESCRIPTION OF THE DRAWINGS

Other advantages of the method and characteristics of the device for implementing it will be clear from the following description of an embodiment given by way of non limitative example, with reference to the accompanying drawings.

FIG. 2 is a partial cross-sectional longitudinal halfsection of a confinement element disposed between an electric suspension cable and a seismic source, FIG. 3 is a partial cross-sectional longitudinal halfsection of another confinement element disposed on an opposite side of the seismic source and, FIG. 4 is a partial cross-sectional view in longitudinal half section of the lower confinement element in an expanded position where it closes off the well and the compartment containing the hydraulic system controlling the confinement of the seismic source.

DESCRIPTION OF THE PREFERRED EMBODIMENT

Figure 1:
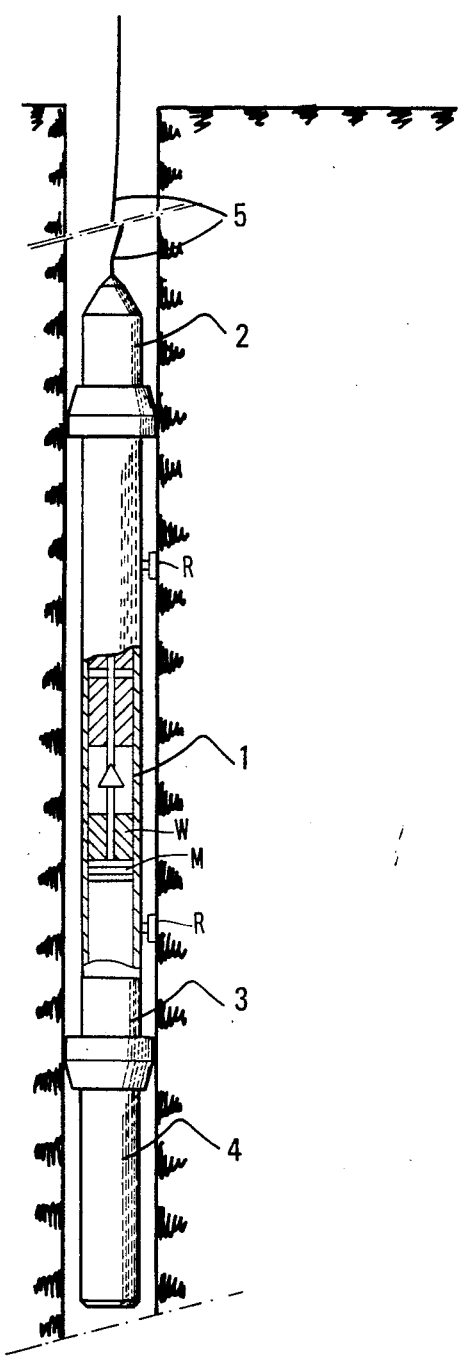
FIG. 1 is a partial cross-sectional schematic view of a seismic wall source of an impact type associated on each side with confinement elements.

The device comprises a seismic well source 1 of a known type, associated with two confinement elements or members 2, 3. The first confinement element 2 is disposed on one side of the seismic well source 1 and the second confinement element 3 is disposed on the opposite side of the seismic well source 1. The seismic well source 1 is extended by a compartment 14 containing a hydraulic operating system which will be described in connection with FIG. 4. The assembly is connected by a multifunction cable 5 of a great length or an electric suspension cable to a surface installation (not shown) comprising control and operating means (not shown). The seismic well source 1 may be of any type such as, for example, an impact seismic source of the type disclosed in U.S. Pat. No. 4,648,478; however, the method of the present invention is particularly suitable for a seismic well source 1 which generates seismic energy within the liquid generally filling the bore holes in which the seismic source is lowered. This is the case of impulsion sources and, particularly, source of the type described in the aforementioned French patent application 2555761 and corresponding U.S. Pat. No. 4,682,309, wherein pulses are generated by a sudden reaction inside a cylindrical cavity of the piston in contact with the well liquid. The hydraulic system of the seismic well source permits resetting of the source and anchorage thereof in a well by opening out mobile arms under the effect of actuating cylinders. The high pressure hydraulic fluid is supplied by accumulator than by a pump, and an electric motor driving the pump as supplied by electric conductors contained in the electric suspension cable 5. It is also possible for sparkers to create shocks in the liquid of the well by an electric current discharge between two immersed electrodes, or else explosion seismic sources.

Each confinement element (FIGS. 2, 3) comprises a central tubular element 6 having at a first end a threaded bore 7. The seismic source is provided with an end piece 8 also threaded at each of its opposite ends. Thus, it may be screw-fitted to the associated confinement elements 2, 3. The tubular element 6 comprises from its first end to its opposite end four portions 9, 10, 11, 12 of decreasing section. On the largest section portion is engaged a pusher element 13 ending in a truncated cone shaped head 14. The pusher element 13 has an inner cavity 15 open on the side opposite the head 14, whose section is adapted to that of portion 9 of the tubular element 6. An opening 16 is formed along the axis of the head 14. A section of the opening 16 is substantially equal to that of the second portion 10 of the tubular element 6. Seals 17, 18 are disposed at the level of the head 14 and the inner cavity 16 so as to provide sealed sliding of the pusher element 13 along the tubular element 6. In a rest position shown in FIGS. 2, 3, the bottom of cavity 15 rests on the opening 16 between the two portions 9 and 10 of the tubular element 6.

An elastomer sheath 19 is engaged on the tubular element 6. At a first end the elastomer sheath 19 bears against the nose (or bevel) of the truncated cone shaped head 14. At an opposite end, at the level of shoulder 20 between the two portions 10 and 11 of the tubular element 6, the elastomer sheath 19 is applied and held thereagainst by a collar 21. In contact with collar 21 is disposed a ring 22 whose sidewall has an opening 23. At the level of opening 23 the tubular element 6 is provided with a circular groove 24. A channel 25 is formed in the wall of the tubular element 6 and opens into groove 24 at a first end and externally off the tubular element 6 under the sheath 19 at its opposite end. A second ring 26 is engaged after collar 21 and ring 22 about the tubular element 6 and locked against translation with respect thereto by a circlip 27. Ring 26 has an external threaded portion 28. A nut 29 is engaged after ring 26. The nut 29 has at a first end an inner threaded portion which screws on to the threaded portion 28 thereof. At its opposite end, the nut 29 has a threaded portion 30 on which an end piece is threadably secured. On one side the end piece comprises a sleeve or cap 31 containing means for fixing the electric suspension cable 5 and any other apparatus usually used in well tools.

On the opposite side, the end piece defines the closed compartment 4 containing the hydraulic system (see FIG. 1).

In the wall of the tubular element 6 of the confinement member 2 (on the electric suspension cable 5 side), at the level of its widest portion 9, a channel 32 is formed (FIG. 2). The channel 32 opens into a cavity 15 at a first end and outwardly of the confinement member 2 at its opposite end.

In the wall of the tubular element of the other confinement member 3 (FIG. 3) and over the whole of its length a first channel 33 is formed which opens outwardly in the vicinity of the threaded bore 7 at a first end and into the compartment 4 at its opposite end. Another channel 34 connects cavity 15 of the confinement member 3 to the first channel 33.

The ends of the two channels 32 and 33 opening out of the confinement members 2, 3 are respectively provided with hydraulic connectors 35, 36 on which are respectively connected the two ends of the same pipe 37. Similarly, the end of channel 33 opposite the connection 36 (FIG. 3) comprises another connector 38 for a pipe 39 connected to the hydraulic system.

Seals 40 are disposed between each tubular element 6 and the corresponding nut 29. Other seals 41 are disposed between nut 29 and the wall of the end piece, whether it is a question of the cap or sleeve 31 or of the compartment 4 containing the hydraulic system.

The hydraulic system comprises (FIG. 4) a hydraulic accumulator 42 charged to a pressure greater than the hydrostatic pressure prevailing in the well at the maximum depth of use of the seismic source and a reservoir 43 at a low pressure, e.g. atmospheric pressure. Accumulator 42 communicates with pipe 39 (see FIG. 3) through a duct 44 and an electro-valve 45 closed at rest. Similarly, pipe 39 communicates through an electro-valve 46 open at rest and a duct 47.

The two electro-valves are supplied with electric current by supply lines 48 connected to the multi-function cable 5.

Figure 4:
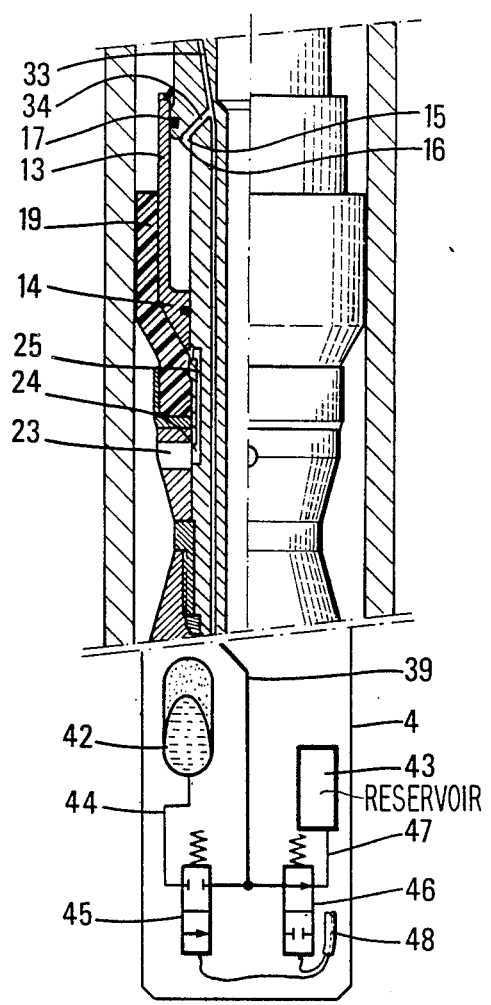

In the rest position of the electro-valves 45, 46 shown in FIG. 4, the pressure applied in the cavities 15 of the two confinement members 2, 3 is that which prevails in the low pressure reservoir 43. The higher external hydrostatic pressure applies the sheaths 19 against the tubular elements 6 and the assembly shown schematically in FIG. 1 may move freely.

In operation, the multi-function cable 5 is operated so as to bring the assembly shown schematically in FIG. 1 into a desired depth of use. The electro-valves 45, 46 are switched through lines 48 and the second electro-valve 45 closes, isolating pipe 39 from the reservoir 43, with the first electrovalve opening thereby placing the pipe 39 in communication with the pressurized accumulator 42. The very high fluid is applied by pipes 32, 33, 34 to two cavities 15 (FIGS. 2, 3). Underthrust, each of the two pressure elements 13 slides, with the beveled heads 14 moving the free end of the two sheaths 19 aside laterally and are engaged from below. The length of the channel 25 is selected so as to open under the resilient sheath 19 in a vicinity of the bevel of the pusher element 13 in a maximum advance position thereof (FIG. 4). Depending upon a section of the well, the dimensions of the pusher element 13, of its truncated cone-shape head 14 and sheath 19 are determined so that the sheath 19 is applied intimately against the surrounding wall. The wall zone of the two confinement members 2, 3 is then sufficiently isolated from the rest of the well. The means for directly coupling a seismic source 1 to the walls of the well are actuated and the electric suspension cable is preferably relaxes so as to avoid radiation of energy therethrough, with the friction forces between the sheath 19 and the well being sufficient to maintain the device in position. The seismic source may then be fired.

The electrovalves 45, 46 are switched through lines 48. The second one 46 closes, isolating pipe 39 from reservoir 43. The first one 45 opening places pipe 39 in communication with the pressurized accumulator 42. The very high pressure fluid is applied by pipes 32, 33, 34 to the two cavities 15 (FIGS. 2, 3). Under the thrust, each of the two pusher elements 13 slides. Their bevelled heads 14 move the free end of the two sheaths 19 aside laterally and are engaged below. The length of channel 25 is chosen so as to open under the resilient sheath 19 in the vicinity of the bevel of the pusher element in the maximum advanced position thereof (FIG. 4). Depending on the section of the well, the dimensions of the pusher element 13, of its truncated cone shaped head and sheath 19 are determined so that the latter is applied intimately against the surrounding wall. The well zone between the two confinement members is then well isolated from the rest of the well, the means for coupling the seismic source to the walls of the well are actuated if it is provided therewith, the electric suspension cable is preferably relaxed so as to avoid radiation of energy therethrough, the friction forces between the sheath and the well being sufficient to maintain the device in position.

The seismic source may then be fired.

If the device is to be moved from one position in the well to another, the electrovalves 45, 46 are actuated so as to isolate accumulator 42 and place pipe 39, and the cavities 15, in communication with reservoir 43 where the pressure is very low. The external pressure pushes the resilient sheat 19 against the tubular element 6. When tightening again it causes the tubular element 6 to move back to its rest position (FIGS. 2, 3). The permanent communication provided by channel 25 and orifice 23 between the well and the bottom of the sheath 19 in the neighborhood of the position of the pusher element 13 in the advanced position (FIG. 4) makes it possible for the hydrostatic pressure to be exerted on the nose thereof and so to overcome the friction forces more readily. Thus, possible jamming of the pressure element 13 under the sheath 19 is avoided.

With the device of the invention, the seismic energy developed by the seismic source within the liquid contained in the well practically does not propagate outside the confinement zone. The effective energy efficiency of the seismic source is therefore increased.

It will be also noted that the confinement elements 2,3 return to the rest position if the electric supply is interrupted, whatever its cause. This prevents any accidental jamming of the device in the well.

In the case where the seismic source used comprises its own hydraulic system, without departing from the scope and spirit of the invention, circuits 32, 33, 34 may be connected by electro-valves identical to 45, 46 to the supply circuits of said system.

Still within the scope of the invention, the confinement elements 2,3 described may be replaced by any expandable members of any type, e.g. packers.

What is claimed is:

1. A method for making a substantial pinpoint emission of a pulsed seismic source, the method comprising the steps of lowering a pulsed seismic source inside one of a well or borehole, directly coupling the pulsed seismic source to walls of the well by retractable anchorage means for enabling an application of energy emitted by the pulsed seismic source directly to the walls, and confining a zone of the well containing the pulsed seismic source coupled with the wall by sealingly isolating the zone of the well containing the pulsed seismic source so as to prevent a propagation along the well, outside the confined zone, of a fraction of the energy generated by the pulsed seismic source when fired and not transmitted directly to the walls by direct coupling by the retractable anchorage means.

2. A substantially pinpoint seismic pulse generating means adapted to be lowered into a wellbore comprising means for generating seismic pulses, anchorage means mechanically connected with said seismic pulse generating means for direct transmission of seismic pulses to walls of the wellbore, and expandable confinement means on opposite sides of said seismic pulse generating means for sealingly isolating confining seismic energy not transmitted directly to the walls of the wellbore and for preventing any propagation of energy along the wellbore outside the confined zone.

3. A substantially pinpoint seismic emission device comprising a pulsed seismic source adapted to be lowered into one of a well or borehole, retractable anchorage means for coupling the pulsed seismic source with formations surrounding the wall and for applying the pulsed seismic source directly to the walls, and at least two expandable confinement means disposed on respective sides of the pulsed seismic source and connected thereto for sealingly isolating a well portion therebetween containing the pulsed seismic source thereby preventing a propagation along the well of a fraction of energy not transmitted directly to the walls of the well by the retractable anchorage means.

4. A substantially pinpoint seismic emission device comprising a pulsed seismic source adapted to be lowered into one of a well or borehole, retractable anchorage means for coupling the pulsed seismic source with formations surrounding the wall and for applying the pulsed seismic source directly to the walls, and at least two expandable confinement means disposed on respective sides of the pulsed seismic source and connected thereto for preventing a propagation along the wall of the well of a fraction of energy not transmitted directed to the walls of the well by the retractable anchorage means, each expandable means comprises a rigid tubular element, a sheath made from a resilient material, means for clamping the sheath against the tubular element at a first end thereof, a pusher element adapted for sliding along the tubular element, said pusher element comprising a truncated cone shaped part adapted for sliding between the tubular element and the sheathing at a second end thereof, so as to move the sheath away from the tubular element, and means for moving each pusher element, wherein a cavity is formed between the pusher element and said tubular element, and wherein the means for moving each pusher element comprises a hydraulic system disposed in a vicinity of the expandable members, pipes connecting the hydraulic system to each cavity and switching means for controlling access to each cavity of the hydraulic fluid produced by said hydraulic system.

5. The device as claimed in claim 4, comprising a channel means communicating with the well at a first end and opening under the sheath at its opposite end.

6. The device as claimed in one of claims 4 or 5, wherein said tubular element comprises several portions having different external sections separated by shoulders, and said pusher element comprises an inner recess having a section adapted to that of a widest portion of said tubular element, and or in a space between a bottom of said recess and one of said shoulders forms said cavity.

7. The device as claimed in claim 4, wherein the hydraulic system is common for the two expandable means and is disposed in a compartment forming an extension of one of the expandable means, an inner cavity of one of the expandable means fixed on an opposite side of the seismic source being connected to the hydraulic system through a first channel, a second channel passing through the tubular element of the other expandable means over an entire length thereof and an external pipe means for connecting said channels together, and or in an inner cavity of the other expandable means communicates with the second channel through a third channel.

8. The device as claimed in claim 6, wherein said pusher element and the sheath of each expandable means are extended by rings locked in translation with said corresponding tubular element and by a nut fixed to one of said rings and an end piece means, and wherein each tubular element comprises means for fixing the tubular element to the seismic source and at an end opposite the end piece means.

9. The device as claimed in claim 8, wherein said end piece of one of the expandable is connected to a multi-function cable connecting the device to an installation outside the well, and the end piece of the other expandable means is a compartment containing said hydraulic system.

10. The device as claimed in claim 4, wherein the hydraulic system comprises a hydraulic accumulator charged to a pressure higher than a hydrostatic pressure prevailing in the well at the maximum depth of use of the seismic source, a reservoir at a very low pressure, and electro-valve means for connecting said channels to one of said hydraulic accumulator or said reservoir so as to cause one of expansion or relaxation of each of the sheaths.

11. A device for pinpointing generation in a wellbore of seismic pulses by a seismic source to be lowered into the wellbore, said seismic source comprising means for generating seismic pulses, anchorage means for directly transmitting generated pulses to walls of the wellbore, and expandable confinement means for sealingly isolating and closing off the wellbore on opposite sides of the seismic source to define a confined zone whereby any fraction of seismic energy of the generated pulse is not transmitted to the walls through said anchorage means are prevented from propagating along said wellbore outside said confined zone.

12. A device for pinpointing generation in a wellbore of seismic pulses by an imploding source to be lowered into the wellbore, said seismic source comprising means for generating sharp pulses by impact of a striking member on an element as a result of sudden retraction of said striking member, anchorage means mechanically connected with said element for directly transmitting generated pulses to walls of the wellbore, and expandable confinement means for sealingly isolating and closing off the wellbore on opposite sides of the imploding source to define a confined zone whereby any fraction of the seismic energy of the generated pulses not transmitted to the walls through said anchorage means are prevented from propagating along said wellbore outside said confined zone.

* * * * *